Aug. 2, 1927.
M. A. HILGERS
CULINARY UTENSIL
Filed March 24, 1927
1,637,859
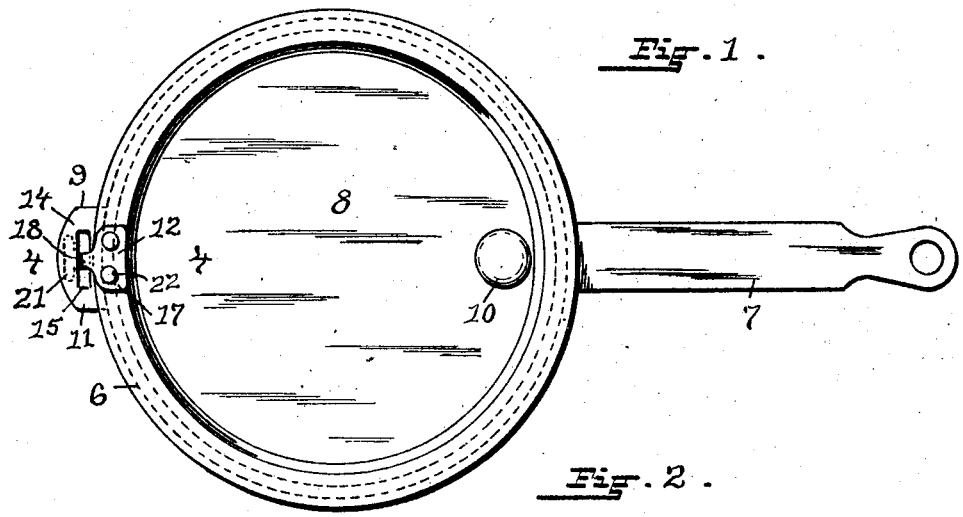
Fig. 1.
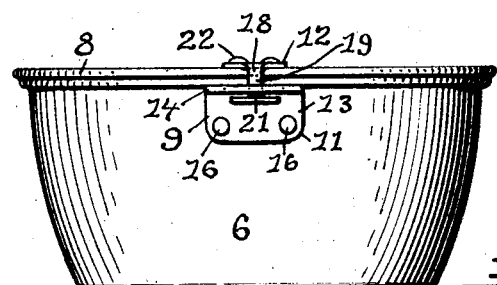
Fig. 2.
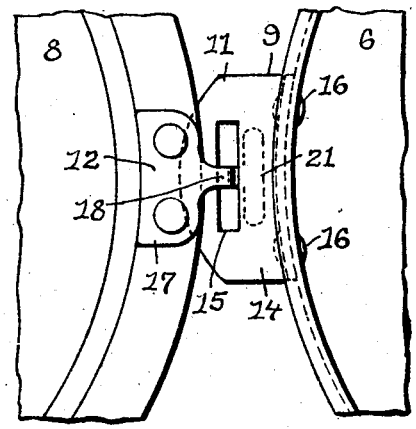
Fig. 3.
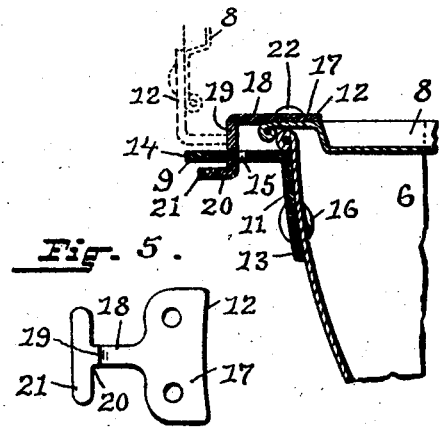
Fig. 4.
Fig. 5.
INVENTOR:
Marie Amelia Hilgers
by Chas. H. Luther
ATTORNEY.

Patented Aug. 2, 1927.

1,637,859

UNITED STATES PATENT OFFICE.

MARIE AMELIA HILGERS, OF PAWTUCKET, RHODE ISLAND.

CULINARY UTENSIL.

Application filed March 24, 1927. Serial No. 178,026.

My invention has reference to an improvement in culinary utensils and more particularly to an improvement in covered culinary utensils such as kettles, sauce pans, frying pans, steamers and the like.

In the usual construction of cooking utensils, such as a kettle or the like, the cover is constructed entirely separate from the kettle, that is to say, there is usually no attaching means for securing the cover to the kettle. Therefore in most cases where the cover should be used on the kettle, the cover, being a separate thing from the kettle, is not used, as the cover is generally mislaid or lost.

The object of my invention is to improve the construction of a covered culinary utensil, such as a sauce-pan, whereby the cover is attached to the sauce-pan, so that the cover may be swung around on the sauce-pan, or raised up from the sauce-pan or the like.

Another object of my invention is to construct the cover attaching means so that the cover, when swung around into an off or open position, will still be held on the sauce-pan in a position to be swung back onto the sauce-pan.

Another object of my invention is to construct the cover attaching means so that the cover may be removed from the sauce-pan or the like, when necessary.

A further object of my invention is to simplify the construction of the cover attaching means, thereby reducing the cost of manufacturing it to a minimum.

My invention consists in the peculiar and novel construction of means for attaching a cover to a culinary utensil, whereby the cover, when attached to the utensil, may be raised or swung sidewise on the utensil and when necessary, entirely removed from the utensil, said attaching means having details of construction, as will be more fully set forth hereinafter and claimed.

Figure 1 is a top plan view of a covered sauce-pan provided with my improved cover attaching means.

Figure 2 is a vertical view of the sauce-pan looking at that part of the sauce-pan having the cover attaching means.

Figure 3 is an enlarged detail plan view of that part of the sauce-pan having the cover attaching means, with the greater portions of the sauce-pan body and cover broken away and with the cover swung around in the open position.

Figure 4 is an enlarged detail vertical sectional view taken on line 4, 4, of Figure 1, through the cover attaching means, with the cover in the closed position in full lines and in the position it would assume to remove the cover from the utensil, in broken lines, and Figure 5 is an enlarged top plan view of the cover member of the cover attaching means.

In the drawing 6 indicates the body, 7 the handle, 8 the cover of a sauce-pan and 9 my improved cover attaching means. The body 6, handle 7 and cover 8 may be of any usual construction. A knob 10 is secured to the cover 8 by any well known means, not shown. It will be noticed in Figure 1 that instead of fastening the knob 10 to the center of the cover, as heretofore done, I secure the knob 10 adjacent the edge of the cover, which brings the knob into a more convenient position for swinging the cover sidewise or raising the cover from the utensil.

My improved cover attaching means 9 consists essentially of a body member 11 and a cover member 12. The body member 11 is constructed preferably of sheet metal and formed to have a body plate 13 and a slotted plate 14 bent outwards at right angles to the body plate 13. The slotted plate 14 has a slot 15 placed at right angles to a line drawn centrally through the body 6 and handle 7, of the sauce-pan, looking at Figure 1. The body plate 13 is secured to the body 6, of the sauce-pan, by rivets 16, 16, or any well known means, close to the top of the body 6, as shown in Figures 2 and 4.

The cover member 12 is also constructed preferably of sheet metal and formed to have a plate 17 on which is an outwardly extending central arm 18 formed to have a downwardly bent member 19, and an outwardly bent member 20, terminating into a T shaped end 21, adapted to pass through the slot 15, in the body member 11. The plate 17 is secured to the top of the cover 8 by rivets 22, 22, or other well known means, in a position to coincide with the body member 11, of the cover attaching means 9.

When in use with the cover 8 in the closed position, the cover 8 is attached to the body 6 by the cover member 12, the downwardly bent member 19 extending down through the slot 15 in the body member 11 with the T shaped end 21 lying under the slotted plate 14, and outwardly from the slot 15, as shown in Figure 4. As the width of the downwardly bent member 19 is less than the width of the slot 15, the cover may now be swung around in either direction on the body 6, by the cover knob 10. When the cover 8 is swung around entirely off the body 6, as shown in Figure 3, the T shaped end 21 will engage with the under side of the slotted plate 14, adjacent the body 6 of the sauce-pan and holds the cover in place. The cover 8 may be raised directly upwards by the cover knob 10 and the cover 8 is easily and quickly removed from the body 6 by raising the cover 8 into the position shown in dotted lines in Figure 4, and pulling the T shaped end 21 upwards through the slot 15, in the slotted plate 14.

By this construction it can readily be seen that the cover 8 is at all times locked to the body 6, except when the cover 8 is in a predetermined position relative to the body 6, for removing the cover from the body of the utensil, when necessary and that the cover 8 may be moved into innumerable positions on the utensil, without unlocking the cover from the utensil.

Having thus described my invention I claim as new:—

In a covered culinary utensil, means for movably attaching the cover to or detaching the cover from the body of the utensil, comprising a body member having a body plate secured to the body of the utensil, a slotted plate on the body plate at right angles to the body plate, said slot being parallel with the body plate, a cover member secured to the cover and having an arm with a bent portion extending downwardly through the slot in the slotted plate, said bent portion of the arm then being bent outwardly and terminating into a T shaped end, which lies under the slotted plate, whereby the cover may be swung sidewise on or off the body of the utensil in either direction and lifted from the body of the utensil without detaching the cover from the body of the utensil, or the cover may be entirely detached and removed from the body of the utensil, when necessary.

In testimony whereof, I have signed my name to this specification.

MARIE AMELIA HILGERS.